United States Patent [19]

Komori et al.

[11] 4,077,714

[45] Mar. 7, 1978

[54] COPYING APPARATUS

[75] Inventors: Shigehiro Komori, Yokohama; Hiroyuki Hattori, Naka; Tsuneki Inuzuka, Machida; Koichi Miyamoto, Tokyo, all of Japan

[73] Assignee: Canon Kabushiki Kaisha, Tokyo, Japan

[21] Appl. No.: 677,176

[22] Filed: Apr. 15, 1976

[30] Foreign Application Priority Data

Apr. 17, 1975 Japan .................................. 50-46863

[51] Int. Cl.² ...................... G03B 27/48; G03B 27/50; G03B 27/70
[52] U.S. Cl. .......................................... 355/51; 355/8; 355/66
[58] Field of Search .................... 355/8, 11, 51, 65, 66

[56] References Cited

U.S. PATENT DOCUMENTS

| | | | |
|---|---|---|---|
| 3,833,296 | 9/1974 | Vola et al. | 355/66 X |
| 3,957,368 | 5/1976 | Goshima et al. | 355/8 |

*Primary Examiner*—Richard A. Wintercorn
*Attorney, Agent, or Firm*—Fitzpatrick, Cella, Harper & Scinto

[57] ABSTRACT

A copying machine capable of copying either bulky originals or sheet originals. The machine includes a bulky original holder and sheet original feeder having a sheet original exposure section arranged at a position sufficiently spaced apart from the bulky original holder so that it does not interfere with the operation of the bulky original holder. A bulky original scanning device includes at least two movable mirrors, one of which is moved out of the optical path to form an optical path for scanning the sheet original.

3 Claims, 9 Drawing Figures

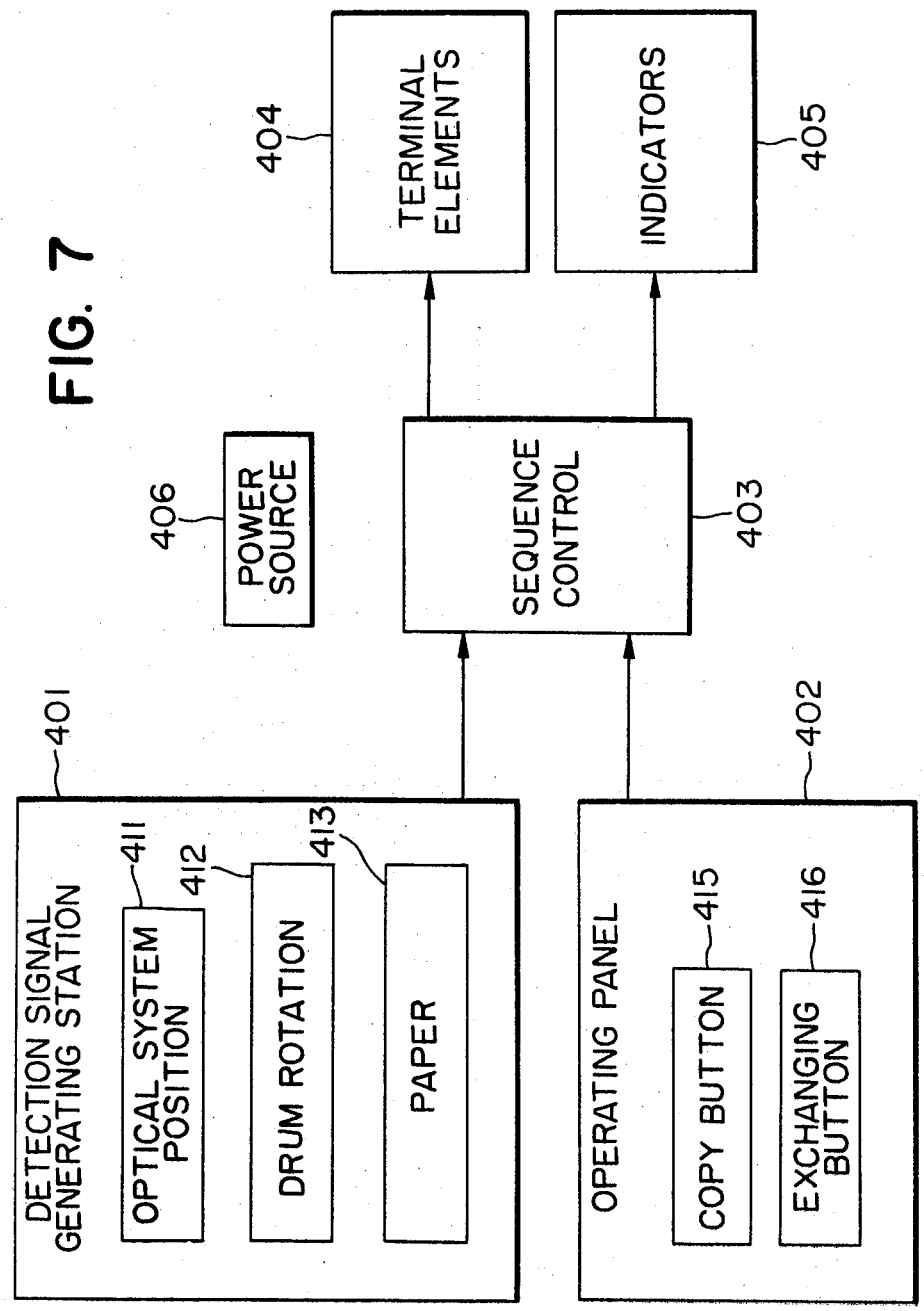

COPYING APPARATUS

BACKGROUND OF THE INVENTION

1. Field of the Invention

This invention relates to a convenient copying apparatus which sufficiently functions both as a sheet original copying apparatus and a bulky original copying apparatus, and further accelerates the copying speed in response to the copy size, and in which additional convenient features are incorporated.

2. Description of the Prior Art

Heretofore, copying apparatuses used where classified into two types, that is, a copying apparatus for the exclusive use of sheet originals and another capable of copying three dimensional materials such as books and the like.

The copying apparatus for the exclusive use of sheet originals cannot copy bulky originals such as books and the like, but can obtain copies merely by introducing sheet originals in the insertion slot thereof, and since there requires no original board nor a return stroke of the optical system for the same process, it produces an accelerated copying speed (about twice).

Furthermore, since the organization of the apparatus is compact, the price of the apparatus is cheap. Furthermore, when the feed of sheet originals is manually carried out, it cannot catch up with the speed of the apparatus, in accordance with the use of the copying apparatus of higher speed, and therefore it is inefficient. While, from this aspect, it has been desired to provide an automatic original feeder (autofeeder), it is easy to provide a copying apparatus having an organization provided with such a device.

Although the apparatus capable of copying bulky materials such as books and the like has a great feature in that it can copy both sheet originals and books, it has such a structure that the copying operation is carried out by stretching the originals flatly on the original board. Hence, when sheet originals are desired to be copied, they cannot be copied unless they should be placed on the original glass by opening the original cover in the same manner as the case of copying bulky originals, and then closing the cover and pushing the copy button.

Moreover, since the presence of the return stroke of the original board or optical system causes time loss corresponding to that much, and hence the copying speed for the same process is necessarily lowered. Furthermore, the organization of the apparatus becomes more complicated and hence the price thereof becomes higher. It is also extremely difficult to make the apparatus provided with such a original autofeeder.

For the above described reasons, the copying apparatuses of the above described two types have their own market fields.

Then, in a mirror transfer type exposure device in which two groups of mirrors generally move at the speed rate of 2 : 1, as shown in FIG. 1, an illuminating section 101 once stops (starting point : a position shown by solid line in FIG. 1) by leaving a preliminary traveling area on this side of an available exposure area (zone of a original board 2), and begins to migrate from this position in a direction shown by arrow A. Further, in most cases, the stop station of the optical system after the completion of copying is coincident with the starting point thereof.

The above described preliminary traveling area is a zone indispensable for reducing to the utmost mechanical wear and fatigue (particularly deterioration of illuminating lamp) due to impact thereby to increase the durability of the device and obtaining an appropriate and excellent visible image, as an accelerating area for exposing the original at a preselected speed from the stop state or a shock absorbing area. That is, the vibration of mirror shade or the like generated by an abrupt speed variation must be erased completely before the exposure zone. Otherwise, it would appear as a synchronous vibration at the proximal end portion of the visible image, and hence good copying could not be effected.

Accordingly, in accordance with the increase in the scanning speed of the apparatus, this preliminary traveling area requires a considerable length and becomes more indispensable.

Under these conditions, in the device which has heretofore been contrived in copying sheet originals, the mirror system which had been positioned at said stop station has been shifted to any station within the range of the reciprocating motion by some means or other or the bulky original placing surface has been utilized as a sheet original exposure area by enlarging the same more than necessary up to the stop station of the optical system, thereby to transfer the sheet originals at a synchronizing speed to slit expose the same. However, in order to utilize a part of said bulky original placing surface and moreover, to transfer the sheet original, a complicated device using a belt or the like must be arranged, and the transfer becomes unstable, and, in copying the bulk originals, such a device must be avoided.

There has been proposed a system wherein by utilizing the fact that the illuminating section stops at a starting point spaced apart from the original board 2, a sheet original feeder is provided at the upper part of the stop station. According to this system, a system of feeding the original by holding the same between heretofore known ordinary rollers can be used, thus accurate transfer is carried out. Furthermore, an operation for transferring the illuminating section can be omitted and time can also be curtailed. However, since said stop station is not spaced so much from the original board 2, a bulky sheet original feeder generally becomes a hinderance in copying bulky originals. Particularly, in the case of copying bulky originals protruded out of the original board 2, such a device must also be avoided, and the organization and the operation of the apparatus become more complicated and troublesome.

SUMMARY OF THE INVENTION

An object of the invention is to provide a copying apparatus capable of sufficiently functioning both as a sheet original copying apparatus and a bulky original copying apparatus.

Another object of the invention is to provide a copying apparatus for universal use furnished with the above mentioned two types of functions and capable of extremely easy changeover from one to the other.

Further another object of the invention is to provide a copying apparatus provided with a sheet original autofeeder.

Still further another object of the invention is to provide a copying apparatus in which a sheet original autofeeder is arranged such that it does not interfere with the copying of bulky originals.

Still further another object of the invention is to provide a copying apparatus making it possible to effect the change-over of sheet original copying to bulky original copying by the displacement of mirrors.

Still further another object of the invention is to provide a copying apparatus making it possible to carry out said change-over by changing the image projection optical path.

More specifically, in the copying apparatus according to the invention, a sheet original feeder is provided at a side end portion of the copying apparatus, which is spaced apart from a original board, and a mirror is displaced to change the optical path, whereby the copying of sheet originals can be carried out. When the optical system for bulky originals is in the stop station, it can be changed over to the second optical path for projecting sheet original images only by eliminating one mirror of said optical system from the first optical path for projecting images of bulky originals, and a sheet original automatic feeder (autofeeder) can be provided at a position spaced from the original board for the bulky originals. Accordingly, the present invention can provide an excellent copying apparatus capable of carrying out easily efficient copying by a method adapted to the configurations of the originals without interfering mutually and becoming a hindrance even when any original of both types is copied.

BRIEF DESCRIPTION OF THE DRAWINGS

FIG. 7 is a block diagram showing an electric control circuit in the present embodiment;

DESCRIPTION OF THE PREFERRED EMBODIMENTS

The present invention will hereinbelow be described with reference to an example. In this embodiment, when bulky originals or cubic materials are three dimensional by an electrophotographic copying apparatus of a transfer system, an original board fixed system is used, and in the case where sheet originals are copied, they themselves are copied while being shifted by carrying rollers.

Figure 1:
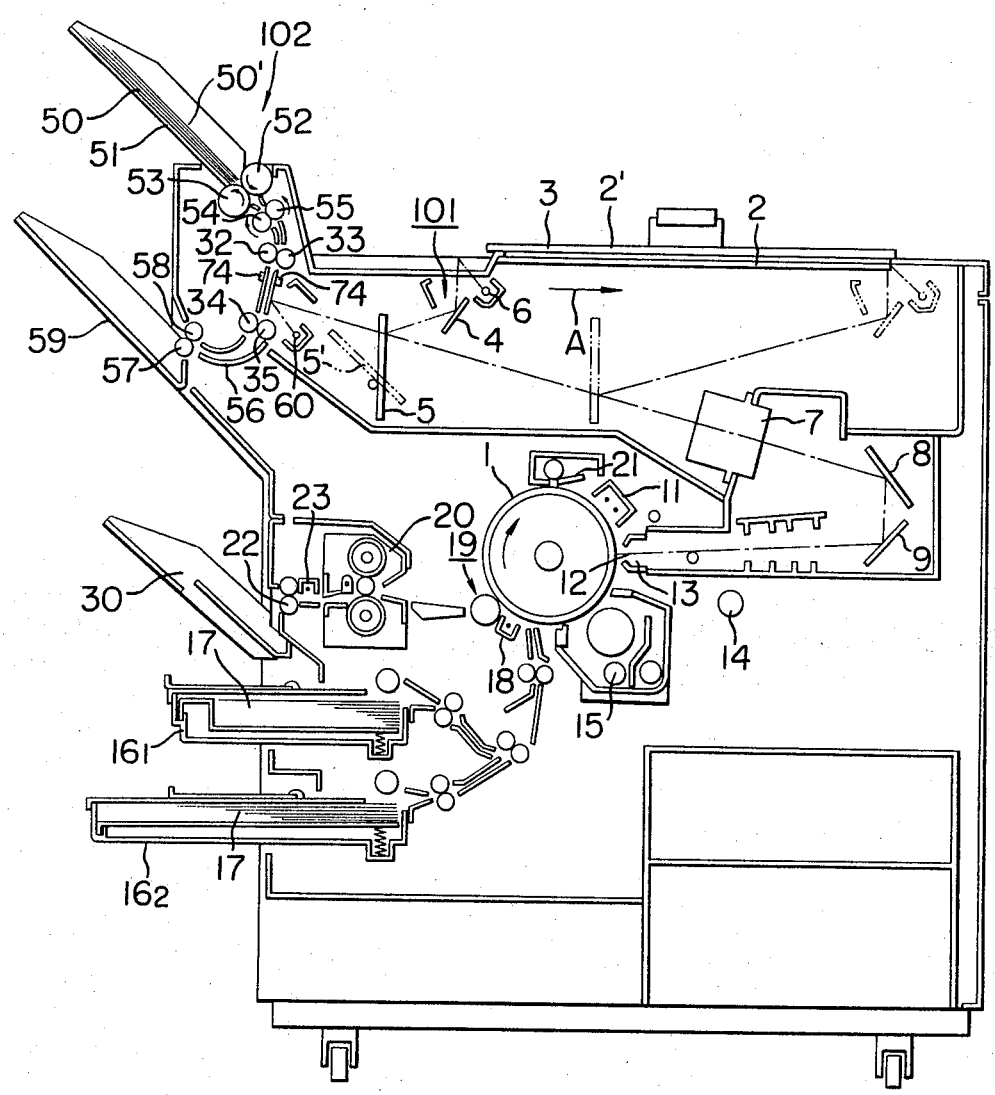
FIG. 1 is a diagram, in vertical section, showing a first embodiment of the present invention.

In FIG. 1, the action of the copying apparatus which is one embodiment of the present invention will be described hereinbelow.

An original 3 is placed on the original board 2 constituting an original placing surface, and pressed by a original pressing plate 2' and an optical system is composed of an illuminating section 101 comprising and illuminating lamp 6, a migrating reflection mirror 5, a lens 7 and stationary reflection mirrors 8 and 9. Accordingly, while the original 3 is being maintained in equal optical path length by the migrating reflection mirror 4 migrating in a direction shown by arrow A in the drawing by forming an integral body with the illuminating lamp 6, and the migrating reflection mirror 5 migrating in the same direction with a migration speed of half of said migrating reflection mirror 4, the original 3 is slit-exposed through the lens 7 and the stationary reflection mirrors 8 and 9, and image-formed on a drum 1. That is, the original 3 is slit-exposed while being scanned by the optical system (illuminating section). The surface of said drum 1 has a photosensitive member covered on its photosensitive layer with a transparent insulating layer, and said photosensitive member is charged positively by a plus charger 11 firstly supplied with a positive high-tension current from a high-tension source (not shown). Subsequently, when the original 3 reaches an exposure section 12, the original 3 placed on the glass plate of original board 2 is illuminated by the illuminating lamp 6, and image-formed on the drum 1 by migrating reflection mirrors 4 and 5, lens 7 and stationary reflection mirrors 8 and 9. Hence, the photosensitive member undergoes AC elimination by an AC discharger 13 supplied with an AC high-tension current from the high-tension source simultaneously when the original image is exposed.

Then, an electrostatic latent image is formed on the surface (photosensitive member) of the drum by receiving full-surface exposure through a full-surface exposure lamp 14, and enters a developer 15.

The development is carried out by a powdery developing agent according to a sleeve system, and the electrostatic latent image is visualized.

Then, a copying material 17 delivered from the interior of a cassette $16_1$ or $16_2$ tightly adheres to the drum 1, the image formed on the drum is transferred by a transferring changer 18 on the copying material 17 by the electric charge due to a positive high-tension current generated from a high-tension source. The copying material which has completed the transference is separated from the drum 1 at a separating section 19, guided to a fixation section 20, after the fixation the surplus electric charge thereof is eliminated by an eliminator 23, and exhausted into a tray 30 by an exhaust roller 22, whereupon the copying is completed. On one hand, the residual tonner thereon is cleaned by a blade 21 press-fitted on the drum surface (photosensitive member), thus the subsequent cycle of steps being repeated. In order to evade intricacies, detailed descriptions on the driving system and the sequence of respective processes will be omitted. There are generally employed such an organization that the photosensitive member is formed into a drum shape and respective parts are arranged around the periphery thereof, a paper feed driving system for carrying out the paper feed in synchronism with the optical system, and a method for driving the illuminating section and the reflection mirror 5 at the speed rate of 2 : 1.

The apparatus according to the present invention is constituted by providing therein a sheet original autofeeder as described.

In FIG. 1, a sheet original autofeeder section 102 is provided at the upper part on the left-hand end of the copying apparatus. Now, when the optical system is in a stop station without performing the copying of bulky originals, the mirror 5 is caused to fall to a station 5' shown by chain line with two consecutive dots. Upon this occasion, the mirrors 4 and 5 are moved out of the optical path, and the autofeeder section 102 enters the optical path.

Figure 2:
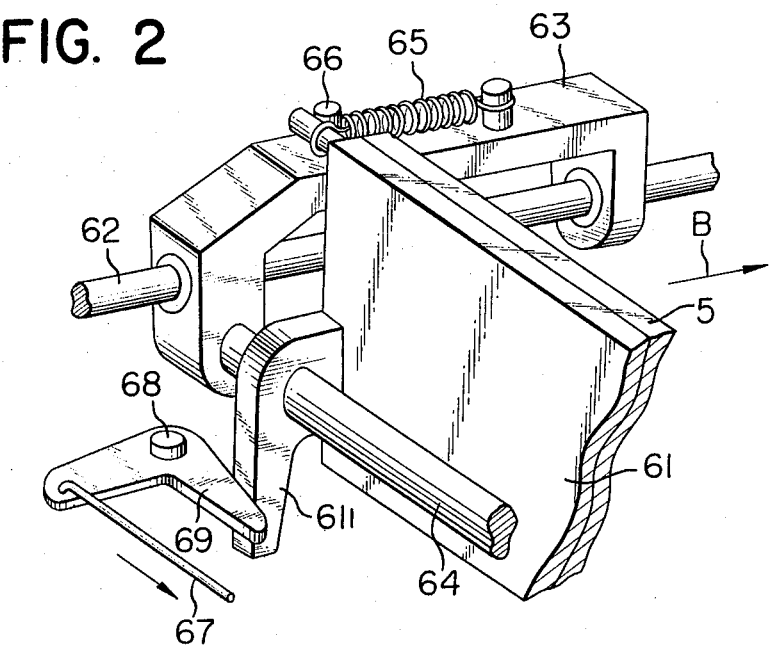
FIGS. 2 and 3 are perspective views respectively showing the actions of mirrors.

In FIG. 2, the mirror 5 is pasted to a mirror board 61 which is rotatably mounted on a stay 64 fixed to a bedplate 63 traveling on a rail 62. The mirror board 61 constantly receives a force of rotating around the stay 64 in the clockwise direction as viewed in FIG. 1, and generally abuts against a stopper 66 to assume a posture shown by solid line in FIG. 1. Now, in copying sheet originals, when an operating knob (not shown) disposed on the front surface of the copying apparatus is switched, a bar 67 is pulled in a direction shown by arrow in FIG. 2. This movement is transmitted in the reverse direction to an arm section $61_1$ of the mirror board 61 through a lever 69 mounted on a shaft 68 fitted to the main structure of the copying apparatus, whereby the mirror 5 rotates on the stay 64 against the force of a spring 65, and falls down on a station 5' shown in FIG. 1 by chain line with two consecutive dots. When the operating knob is returned to the original position, the mirror 5 returns to the original station shown by solid line by the action of the spring 65. Since the bedplate 63 migrates from the stop station in a direction shown by arrow B, the contact between the lever 69 and the arm section $61_1$ of the mirror board is carried out only at the stop station, and has no influences whatsoever over the ordinary copying operation for bulky originals.

Furthermore, the change-over of the afore-described operating knob causes the electric circuit and the like to be changed over from the use for bulky originals to that for sheet originals.

In the autofeeder section 102, when piled sheet originals 50 are placed on a sheet original insertion board 51, an uppermost sheet original 50' proceeds while being separated by separation and feed rollers 52 and 53, and is fed into a space between rollers 32 and 33 by feed rollers 54 and 55, and its proximal end is detected by a detecting element 74 (light accepting element, microswitch or the like), whereby it stops temporarily. When the drum rotates up to a predetermined station, the sheet original is carried between the guide glass, guide plate and the like while synchronizing with the rotation of the drum 1 again by means of rollers 32, 33, 34 and 35, and illuminated by the lamp 60, whereupon a visible image thereof is formed on the drum 1, and the original 50' is delivered to the original tray 59 by means of delivery rollers 57 and 58.

This operation is carried out continuously until the sheet originals 50 on the sheet original insertion board 51 are all gone.

Figure 3:
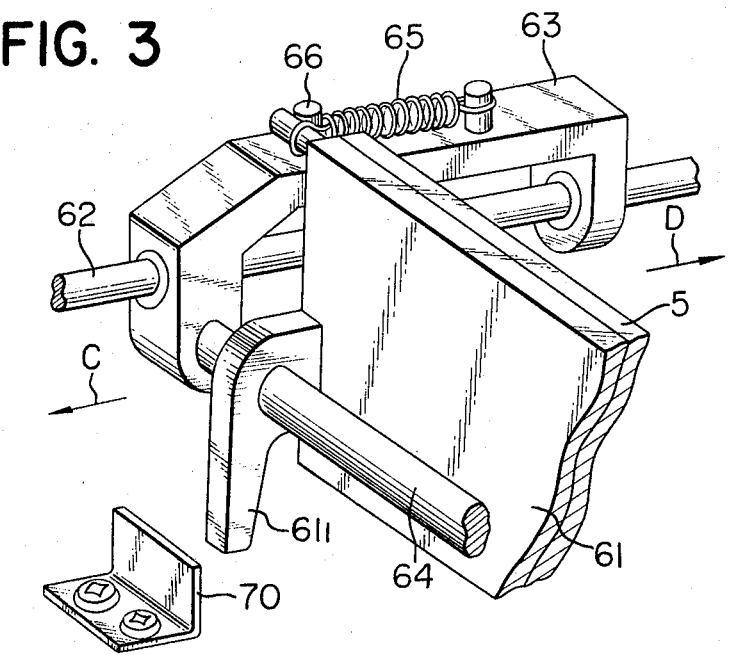

FIG. 3 illustrates the second example in which the operation of causing the above described mirror 5 to fall down was automated. This is intended to place the mirror 5 certainly in a fallen state when the optical system is in a stop station by utilizing the transference of the optical system. As shown in the drawing, a stopper 70 fixed to the main structure is provided in the vicinity of the stop station of the mirror 5. Then, when the mirror on the bedplate 63 travels toward said stopper on the rail 62 in a direction shown by arrow C, the arm section $61_1$ of the mirror board 61 abuts against the stopper 70. When the bedplate 63 further continues to travel, the mirror board 61 and the mirror 5 begin to rotate on the stay against the force of the spring 65, and then fall down. Thereafter, since the bedplate 63 reaches the stop station and comes to a stop, it follows that the mirror 5 is retained in a fallen state. When the bedplate 63 is started in a direction shown by arrow D from this state, the arm section $61_1$ of the mirror board separates from the stopper 70, and the mirror 5 is restored to the original station, whereby the normal copying of bulky originals can be carried out. For this purpose, abutment of the arm section $61_1$ of the mirror board against the stopper must be made at an interval after the optical system has left the available exposure zone and until it reaches the stop station.

If the apparatus be arranged in such a manner, while the optical system is in suspension, the copying of sheet originals can be made at all times. Hence, labor of changing the optical path over from that for the bulky originals to that for sheet originals is not required and the copying of the sheet originals can be conducted merely by operating the starting switch of the autofeeder section 102, and hence, the apparatus is exceedingly simple and convenient.

However, in switching the optical path from the first optical path for bulky originals to the second optical path for sheet originals, the sheets of mirrors used in both optical paths must be increased or decreased in even number in order that normal image-formation is conducted in either or both cases. Accordingly, while, in the above described two examples, the mirror 5 is caused to fal down and to escape from the first optical path thereby forming the second optical path, the second optical path has mirrors in number less than those of the first optical path by two mirrors 4 and 5. In an optical system in which more mirrors are used between the original board 2 and the lens 7 to form the first optical path, if, in addition to the second mirror, mirrors bearing even numbers counted from the original board are removed from the first optical path, it is possible to obtain the second optical path from which mirrors in even number are removed.

Furthermore, the method of spacing mirrors from the first optical path is not limited to a system in which mirrors are caused to fall down as in the above described two examples but a system of transferring mirrors within the reflection planes thereof or that of transferring mirrors in the perpendicular directions (left and right directions in the drawing) of the mirror planes can realize the object, and can achieve the quite same effects.

Figure 4:
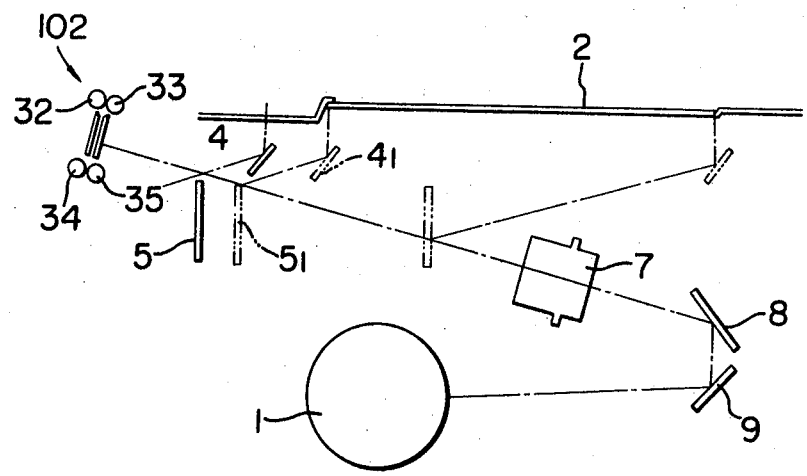
FIG. 4 is a diagram, in vertical section, showing a second embodiment of the invention.

FIG. 4 illustrates a third example in which the device according to the present application is applied to the optical system identical with that of the first example. In this example, the mirror 5 is spaced from the first optical path without any special operation such as bringing down the mirror 5. In this optical system, a part thereof used for the reflection of the mirror 5 varies depending upon the position of the optical system. That is, when the optical system is positioned at the left-hand end as shown in FIG. 1, the upper end of the mirror 5 is used for the reflection effective for image formation, and in accordance with the migration of the optical system in the right-hand direction, the effective reflection part of the mirror 5 also descends.

This example utilizes this property of mirror, and the size of the mirror is selected such that when it is at an exposure starting point $5_1$, the uppermost end thereof is used for the reflection. Accordingly, when the mirror 5 is positioned at a starting point (a station 5 shown by solid line) near therefrom toward the left-hand by the above described preliminary traveling area (generally, several + mm), the optical path passes the upper part of the mirror 5, and it follows that the change-over from the first optical system to the second optical path has been conducted. Assuming that this starting point is a stop station of the optical system, the second optical path would be obtained at every time when the optical system is in suspension.

This system is exceedingly advantageous in accuracy and durability because there is no necessity of especially operating parts of the optical system generally weak and requiring delicate adjustments, in addition to the effects of simple and convenient operative properties as shown in the second example.

Next, in the autofeeder 102 shown in FIG. 1, the sheet originals 50 piled up on the sheet original insertion board 51 turning their surfaces to be copied upside are overlapped in the order of No. 1, No. 2, ..., No. $(n-1)$, No. $n$, from the top. The originals 50 are delivered successively from the uppermost sheet No. 1, and overlapped on the original tray 59. The order is No. 1, No. 2, ..., No. $n$ from the bottom with their surfaces to be copied downside. Accordingly, when the originals piled up on the original tray 59 are reversed as they are being formed into a bundle and then placed on the sheet original insertion board 51, the same copying can be performed repeatedly.

However, on the tray 30 of the main structure of the copying apparatus there are generally overlapped the copying materials with their imaged surfaces turned down. Accordingly, when the originals are passed through the apparatus in the order of No. 1, ..., No. $n$ by means of said autofeeder, the copying materials on the tray 30 are overlapped in the order of No. $n$, ..., No. 1, which is reverse to the order of the originals. This is very inconvenient for handling. In order to avoid such a trouble, there are required labors of rearranging the order of originals prior to the copying operation, copying them in the order of from No. $n$ to No. 1, and returning them in the original order after the completion of the copying operation. Such matters are disadvantageous for the autofeeder designed with intension to raise the efficiency of the copying of sheet originals.

Figure 5:
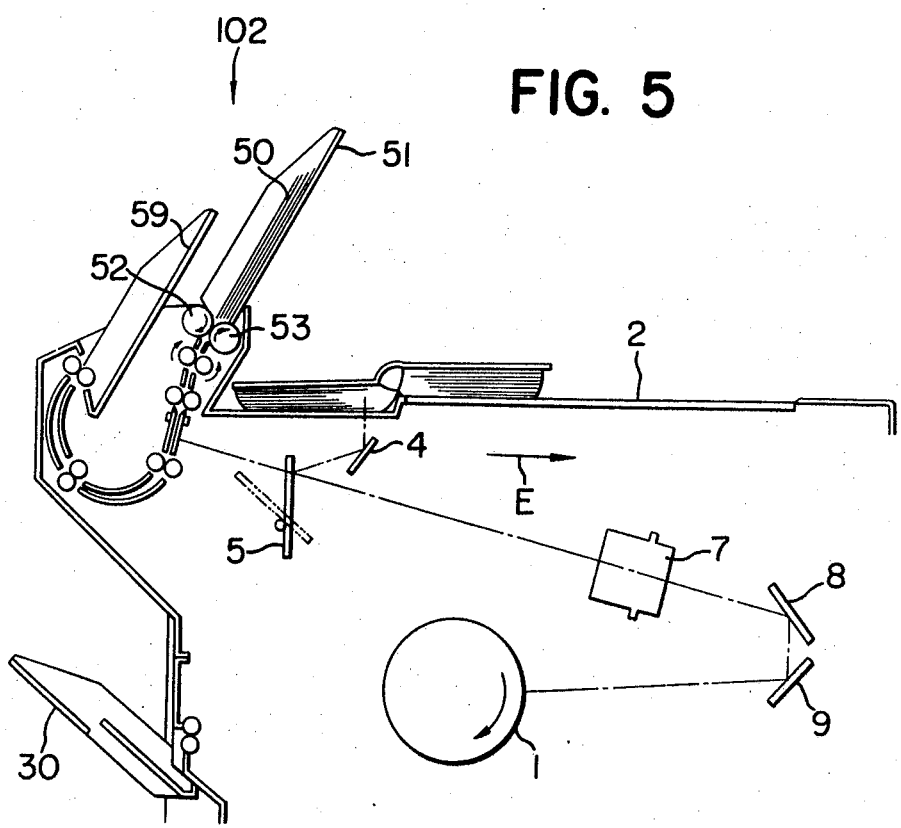
FIG. 5 is a diagram, in vertical section, showing a third embodiment of the invention.

In order to solve this problem, the autofeeder section 102 must be arranged as shown in FIG. 5 in the case of the copying apparatus of this type. By this arrangement, the orignals 50 are overlapped on the sheet original insertion board 51 with their surfaces to be copied turned downside from the bottom in the order of from No. 1 to No. $n$, and delivered from the uppermost No. $n$ original and hereinafter in the order of No. $(n-1)$, ..., No. 1 by the actions of separation and feed rollers 52 and 53. The originals with their surfaces to be copied turned upside are overlapped on the original tray 59 in the order of No. $n$, ..., No. 1 from the bottom, and this order is the same as the original order. Further, on the tray 30 of the main structure of the apparatus there are overlapped copying materials with their surfaces to be imaged turned down in the order identical to that of the originals, that is, No. $n$, ..., No. 1 from the bottom, and therefore the copied materials obtained hereupon have the order identical to the order in which the originals are delivered. Hence, the problem is solved. In such a manner, in order to perform the efficient copying by use of the autofeeder, the apparatus must have an organization in which the originals are fed in the order of from No. $n$ original to No. 1 original.

Now, in the structure of the apparatus as shown in FIG. 5, the autofeeder section 102 is projected toward the original board 2, as apparently observed in the figure, and hence, when a bulky original, particularly one side page of a book as shown in the figure, is copied, it becomes a hindrance.

This is a problem occurring from the relationship between the proceeding direction of the original in the autofeeder, in other words, the optically scanning direction (shown by arrow E in the case of FIG. 5) of the optical system for bulky originals and the location of the autofeeder 102.

Figure 6:
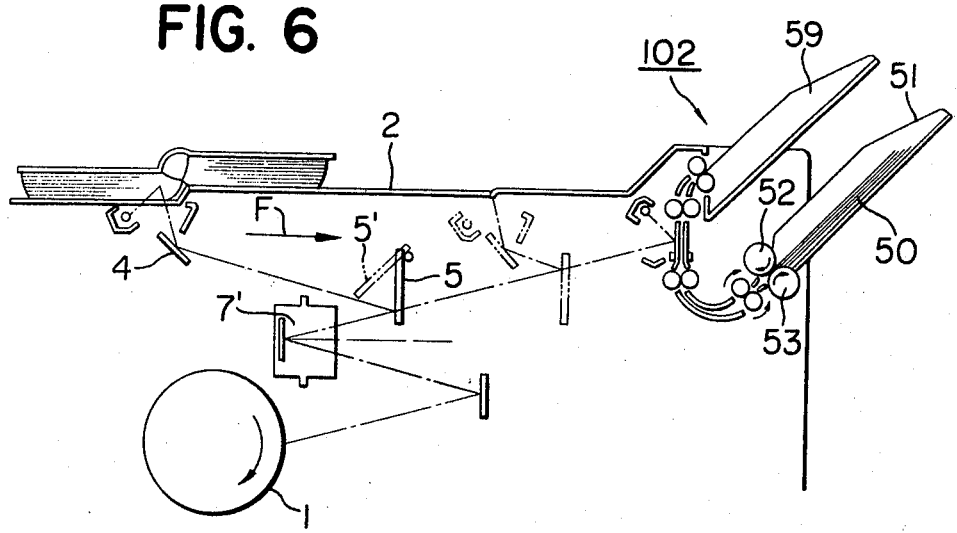
FIG. 6 is a diagram, in vertical section, showing a fourth embodiment of the invention.

The fourth example embodying the present invention which has solved this problem is illustrated in FIG. 6. This example handles an optical system using an inmirror lens 7′, said optical system migrating in a direction shown by arrow F thereby to carry out slit exposure. Although switch-over from the fist optical path to the second optical path is carried out by causing the mirror 5 to fall down at the stop station of the optical system, methods illustrated in the above mentioned other examples may be used. The autofeeder 102 in this example has a sheet original insertion slot 51 at its lower side and a original tray 59 at its upper side, and the originals proceed upwardly. In this autofeeder 102, since the originals are fed from No. $n$ original, there occurs no such a disadvantage that the order of the originals and that of the copying materials are reversed from each other. As is apparent from the figure, since the autofeeder 102 is not projected from the side of the original board 2, and furthermore, it is spaced apart from the standard position (left hand end shown in the figure) of the original board 2, no trouble occurs in the case of copying bulky originals. The reason therefor is that the autofeeder 102 is provided in the extension of the scanning direction (shown by arrow F) of the optical system. The reason why a trouble has occurred in the apparatus shown in FIG. 5 resides in that the relationship between the scanning direction (shown by arrow E) and the position of the autofeeder 102 is reversed from that of the present example.

Next, the electric control circuit in the above mentioned example will be described. The electric control circuit in the present example can be roughly divided into blocks shown in FIG. 7. Firstly, a detection signal generating section 401 is a group of devices for generating detection signals. In the group, at the time of copying bulky original, an optical system position detector 411 detects the home position (starting position) of the optical system, the paper feed position for indicating timing for commanding the paper feed from the cassette, and the optical system reversing position for reversing the system from the forward movement to backward movement. Each of these devices is operated in such a manner that a cam fixed to the optical system pushes the detection lever of a microswitch fixed to the non-migration section. Further, a photosensitive drum rotation position detector 412 is a device for detecting the rotation position of the photosensitive drum 1 (shown in FIG. 1). In this example, it is extremely convenient to provide for the drum 1 a predetermined relationship between the rotation position of the rotating drum and the time of starting exposure of the original so as to avoid the formation of joints, at the time of forming said latent image. For this purpose, a standard position (drum home position) is provided with respect to the rotation position of the drum, and further a rotation position for indicating the exposure start timing is also provided, thus these rotation positions being detected. More specifically, the drum stops its rotation at the standard position, and exposure of the original can be started by use of a predetermined rotation position detecting output as a timing signal. Furthermore, from the drum rotation position detector 412 delivered is a detecting signal for detecting the rotation position or the like to be used as a jam timing signal, in accordance with necessity, but the parts relating to the present invention will be further illustrated hereinbelow. In practicing the apparatus according to the present invention, a drum synchronizing system in which various synchronizing signals are generated from the rotation positions of said drum is employed. The present invention, however, is not restricted merely thereto. Furthermore, these rotation position detecting means are arranged by providing a cam on the drum and fixing a microswitch to the non-rotating section. Next, a respective section paper detector 413 is a paper detector comprising a CdS photosensitive element-lamp pair and the like, and monitors for minotoring the normal carrying operation of the copying materials, and those for sheet original carrying for detecting the presence of copying materials in the cassettes 16$_1$ and 16$_2$ (FIG. 1) are provided at necessary spots. As detecting means, a microswitch and the like are used, in addition to said CdS-lamp pair, but the detailed description thereof will be omitted. The detection signal generating station 401 further includes means to automatically detect various signals necessary for the sequence control in the present embodiment of the copying apparatus, such as a thermometric device of the heater section requiring controls on quantity, concentration and temperature of the developing agent.

Next, the operating section 402 includes a copy button 415, and a button 416 for the change-over of copying from bulky original to sheet original, and further signal source means established by the user, such as a cassette change-over button, a copy sheet number setting dial, a copy stop button and the like, which are all now shown in the drawing.

Next, the sequence control section 403 is a circuit for generating drive command signals to various terminal elements for carrying out respective predetermined copying cycles on the basis of signals issued from said detection signal generating section 401 and operating section 402 and further those of timer means and the like preset within the sequence control section 403 itself, and functions to perform the detection of jam, and further generation of various indication command signals, in addition to the above mentioned sequence control. In the present example, a digital IC constituting mainly a two-valent logical circuit is employed. This sequence control section 403 can be roughly divided functionally into an optical system transference (forward movement, backward movement and stoppage) control section, main driving motor control section, sheet original carrier control section, various illuminating elements, heater element control section, high-tension source control section, discrimination of jam generation, treatment section and the like. However, there is no great difference between said sequence control section and the conventional control circuit in the copying apparatus except the section for controlling switch-over of from bulky original copying to sheet original copying.

The various terminal elements section 404 includes high-tension source, various driving motors such as main driving motors, fan motors, developer, and pump driving motors, and electric terminal elements such as original lamp, fixer heater, various electromagnetic clutches, plunger (solenoid), counters and the like, said section being applied with a current in accordance with driving command signals from the sequence control section 403, and displays operating functions.

Moreover, the indicator section 405 is a part for carrying out indications required for the convenience of the user, such as an indication any of bulky original copying and sheet original copying is being practiced, another indication of the supply of consumable materials to the developer, copying paper and the like, further another indication at the jamming time, and still further another indication that the number of copy practiced sheets, on the basis of indication command signals generated from the sequence control section 403 or signals issued directly from the detection signal generating section 401 and the operating section 402. The power source section 406 include main switch, circuit breaker, door switch, power source transformer, and voltage stabilizing circuit, and is a part for supply AC and DC power sources necessary for above mentioned respective parts.

Figure 8A:
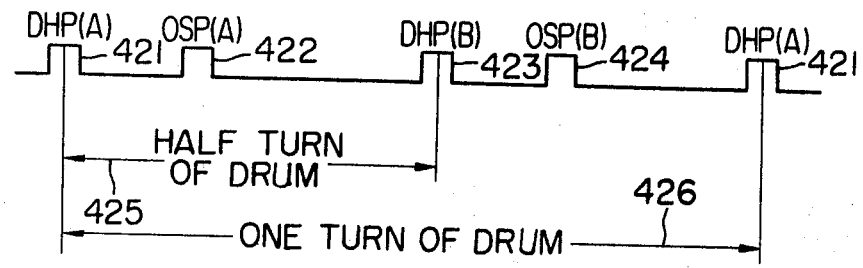
FIG. 8a is a waveform diagram of signals in respective terminals.
Figure 8B:
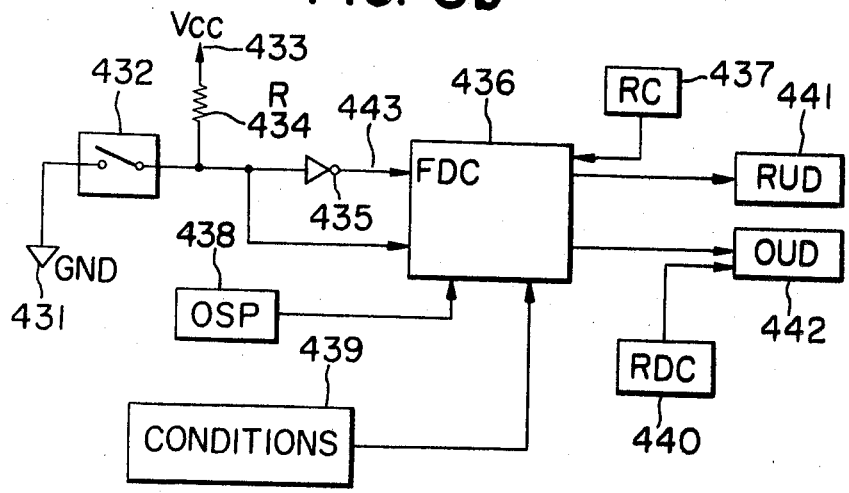
FIG. 8b is a block diagram showing the same.

By the above mentioned organization, the copying process is controlled. The bulky original copying-sheet original copying change-over control which is a feature of the present invention will hereinbelow be described more in detail. In FIG. 8b, a switch 432 correspond to switching means in the above described copy changeover device 416. In the example illustrated in FIG. 7 of the present invention, in place of said switch 432 there may be used a microswitch driven by cam means provided in the operating section 102 and interlocking with a lever by being operated by user's manipulation of the lever shifting the bar 67 in a direction shown by arrow at the time of the sheet original copying. Alternatively, in the case where the mirror 5 does not hinder the second optical path without operating the same from the external part as in the cases of examples illustrated in FIGS. 3 and 4, a microswitch directly driven by a copy change-over button provided in the operating section may be provided and used in placed of said switch 432. One terminal of said switch 432 is connected with a gland GND 431, and afforded with a potential corresponding to logic 0 in the two-valent logical circuit. The other terminal of the switch 432 is connected through a resistor R 434 with a power source Vcc 433, with a circuit of a forward drive control section FDC 436 through a direct signal line 444, and further with FDC 436 through an inverter 435 and further through a signal line 443. Since the power source Vcc 433 has a potential corresponding to logic 1, when the switch 432 is open, the potential corresponding to logic 1 is applied from the signal line 444 to FDC 436 and that corresponding logic 0 from the signal line 443 thereto. When the switch 432 is short-circuited, the potential corresponding to logic 1 and that corresponding to logic 0 are applied to FDC 436 from the signal lines 443 and 444, respectively. Accordingly, at the time of copying bulky originals, the switch 432 assumes an open state, and the signal lines 443 and 444 apply potentials corresponding to logic 0 and logic 1, respectively, thereby to be acknowledged by the forward drive control section FDC 436. Upon this occasion, although concrete means is omitted to be described, the above described exposure start timing signal OSP is applied to FDC 436 from an exposure start timing signal generator 438 induced in the drum rotation position detector 412, and further information signals concerning various conditions, that is, whether or not the copy button is pushed, and whether or not the various consumable materials are present, are introduced in FDC 436 from the device group 439 shown integrally for convenience's sake, and can deliver a forward drive command signal to an optical system driving section OUD 442 including an electromagnetic clutch which can transmit a power from a power source of the main driving motor for shifting the optical system. Furthermore, an optical system a back signal from a device RDC 440 for optical generating a back command signal by an optical system reversing position signal from an optical system position detector 411 is introduced the optical system driving section OUD 442. Then, the switch 432 is pushed for copying sheet originals and short-circuited, whereupon the signal lines 443 and 444 represent logic 1 and logic 0 and acknowledged by FDC 436. Upon this occasion, when various conditions are satisfied in a similar manner as the case of copying bulky originals, a drive command signal is issued at a suitable timing from FDC 436 to a sheet original carrying roller driving device RUD 441 including a driving source for sheet original feed rollers 52, 53 and carrying rollers 54, 55, 32, 33, 34 and 35 (FIG. 1). When the sheet originals are carried in the direction of the exposure position by means of rollers 32 and 33, and detected by a paper detector RC 437 including the CdS photosensitive element-lamp pair 74 (FIG. 1), the rollers 32 and 33 once stop their rotations and rerotate in synchronism with the rotating drum, that is, by the OSP signal from a device 438, thereby to carry the sheet originals. However, with respect to the preliminary traveling distance of the optical system at the time of copying bulky originals, and the preliminary traveling distance at the time of copying bulky originals, that is, the distance from the proximal end of the sheet originals at the time said rollers 32 and 33 have once stopped their rotations to the exposure position, the former is generally longer than the latter. Hence, in order to make the proxial end of the latent image formed on the photosensitive drum equal at both times of copying bulky originals and sheet originals, the timing of rerotation of the rollers 32 and 33 in copying the sheet originals can be obtained by delaying the OSP signal by a time corresponding to the difference in the preliminary traveling distances.

In this respect, the method for the change-over of bulky original copying and sheet original copying is not limited merely to the use of the switch 432. For instance, it is achieved by generating a signal equivalent to a change-over signal delivered by the switch 432, and introducing said signal into FDC 436 as a change-over signal by a sheet original detecting signal issued by a sheet original detector provided on the sheet original insertion board 51 as shown in FIG. 1 or a sheet original detecting signal from a paper detector 74 at the time the sheet originals are placed on the insertion board 51, and carried until the sheet originals are detected by the paper detector 74 when paper feed rollers 52 and 53 and carrying rollers 54, 55, 32 and 33 are caused to continuously rotate. Upon this occassion, however, in the case where the bulky original copying cycle is still continued when the sheet originals have been detected, it is necessary to delay the change-over up to a suitable partition of the copying cycle.

Furthermore, in the drum synchronizing system used in this example, it becomes possible to raise hourly efficiency in the copying of sheet originals with respect to the copying of bulky originals because an optical system returning (back moving) step is unnecessary in the copying of sheet originals. In raising said efficiency, there is used a method for forming one copying cycle by one rotation of the drum in the copying of sheet originals while in copying bulky originals one copying cycle is formed by two or more rotations of the drum, or another for forming one copying cycle by half or less rotation of the drum in the copying of sheet originals, while in the copying of bulky originals one copying cycle is formed by one rotation of the drum. In this example, both methods are used depending upon the copying size. Now, the sequence in the case where the sheet original copying cycle is achieved by the half rotation of the drum will be described hereinbelow. In this case, by the rotation of the drum it can be achieved by generating a signal shown in FIG. 8a as a time chart. More specifically, after a drum home position signal DHP (A) 421 which becomes a standard position has been generated, OSP (A) 422 which becomes an exposure timing signal is generated. However, after the drum has made half rotation from the standard position, it generates again a signal DHP (B) 423, and further after the drum has made half rotation from the time the signal OSP (A) 422 has been generated, it generates a signal OSP (B) 424. In this example, only when the photosensitive member drum 1 has reached the standard rotation position after the completion of copying, that is, the signal DHP (A) 421 has been generated, the drum can stop. Further, the signal DHP (A) is used as a start timing signal for the copying preparation step such as lightening of illuminating means and the like prior to the start of exposure, whereas the signal DHP (B) 423 is handled as a signal equivalent to the signal DHP (A) except that DHP (B) 423 has no role as a drum stop possible position in copying sheet originals, whereby two copying cycles can be formed while the drum makes one rotation.

With respect to the exposure start timing signal, signals OSP (A) 422 and OSP (B) 224 are generated in correspondence to the standard position signals DHP (A) 421 and DHP (B) 423, respectively. In this case, the sheet original copying can be made at a velocity twice as rapid as that of the bulky original copying.

The electrical control system relating directly to the present invention has been described in the foregoing. The control circuits for respective parts which are not illustrated are similar to those already practiced in the conventional copying apparatuses, and hence do not directly relate to the present invention and are omitted to avoid intricacies.

What is claimed is:

1. A copying apparatus for copying either bulky originals or sheet originals comprising:
  means for holding a bulky original;
  sheet original transporting means, disposed away from said holding means, for transporting a sheet original;
  a photosensitive member;
  an image forming lens for forming an image on said photosensitive member of a bulky original with light projected from said original holding means along a first optical path and for forming an image of a sheet original on said photosensitive member with light projected along a second optical path;
  scanning means for scanning a bulky original positioned on said original holding means including at least two movable mirror means which define the first optical path, wherein at least one of said mirror means intersects and blocks the second optical path during scanning of a bulky original as it moves along an imaginary line which extends at an angle with respect to the second optical path and which has a length sufficient for complete scanning of a bulky original, and wherein said one mirror means is movable along an extension of the imaginary line out of the second optical path to permit the formation of an image on said photosensitive member of a sheet original transported by said transporting means with light projected along the second optical path; and processing means for forming a copy from the image of an original formed on said photosensitive member.

2. A copying apparatus according to claim 1, wherein said sheet original transporting means is provided with means for successively transporting a plurality of sheet originals without manual intervention.

3. A copying apparatus according to claim 1, wherein the scanning of a bulky original starts at one end of said original holding means and terminates at the other end thereof, and wherein said sheet original transporting means is located adjacent to said other end of said original holding means.

* * * * *

UNITED STATES PATENT AND TRADEMARK OFFICE
CERTIFICATE OF CORRECTION

PATENT NO. : 4,077,714

DATED : March 7, 1978

INVENTOR(S) : SHIGEHIRO KOMORI, ET AL

It is certified that error appears in the above-identified patent and that said Letters Patent are hereby corrected as shown below:

Col. 1, line 14, "where" should be --were--.

Col. 3, line 50, should read --bulky originals or three dimensional materials are copied--.

Col. 4, line 57, after "described" insert --below--.

Col. 6, line 21, "fal" should be --fall--.

Col. 7, line 40, "orignals" should be --originals--.

Col. 11, line 53, "occassion" should be --occasion--.

Signed and Sealed this

Eighteenth Day of July 1978

[SEAL]

Attest:

RUTH C. MASON
Attesting Officer

DONALD W. BANNER
Commissioner of Patents and Trademarks